Dec. 30, 1958
G. W. LAURIE, JR
2,866,432
TIRE PRESSURE INDICATING DEVICE
Filed Sept. 7, 1956
2 Sheets-Sheet 1
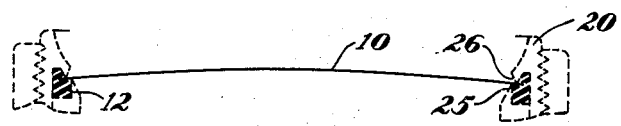
Fig. 1
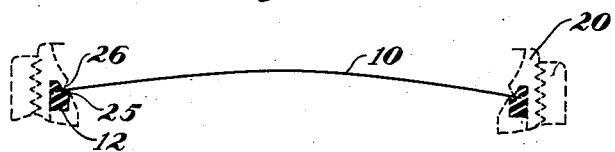
Fig. 2
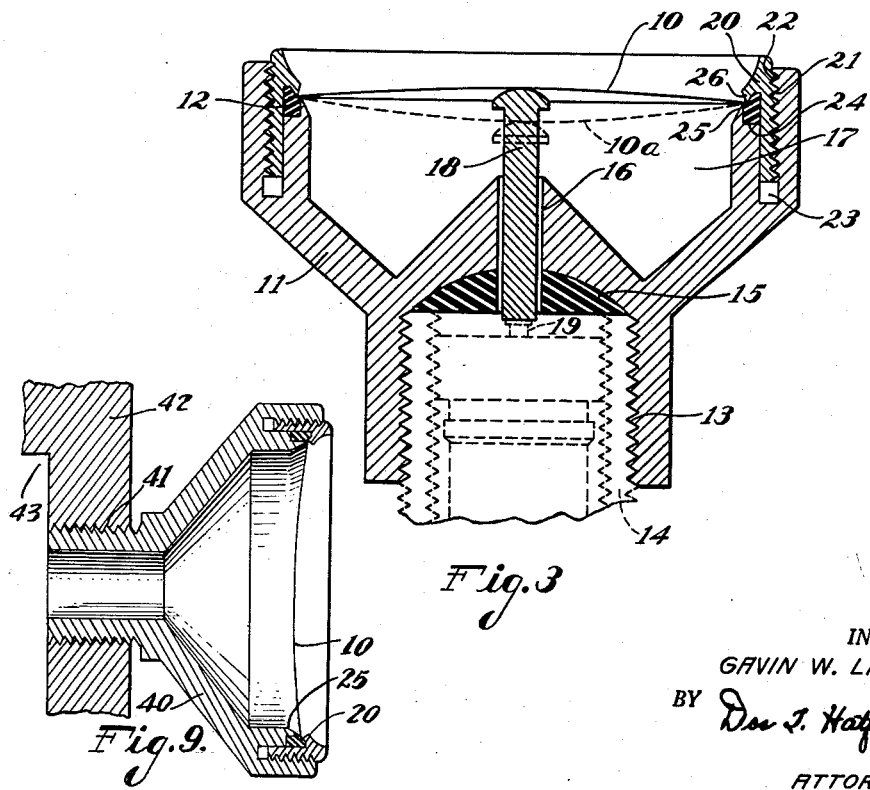
Fig. 3
Fig. 9
INVENTOR.
GAVIN W. LAURIE JR.
BY Don J. Hatfield
ATTORNEY Dec. 30, 1958
G. W. LAURIE, JR
2,866,432
TIRE PRESSURE INDICATING DEVICE
Filed Sept. 7, 1956
2 Sheets-Sheet 2
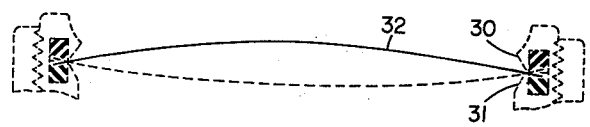
Fig. 4
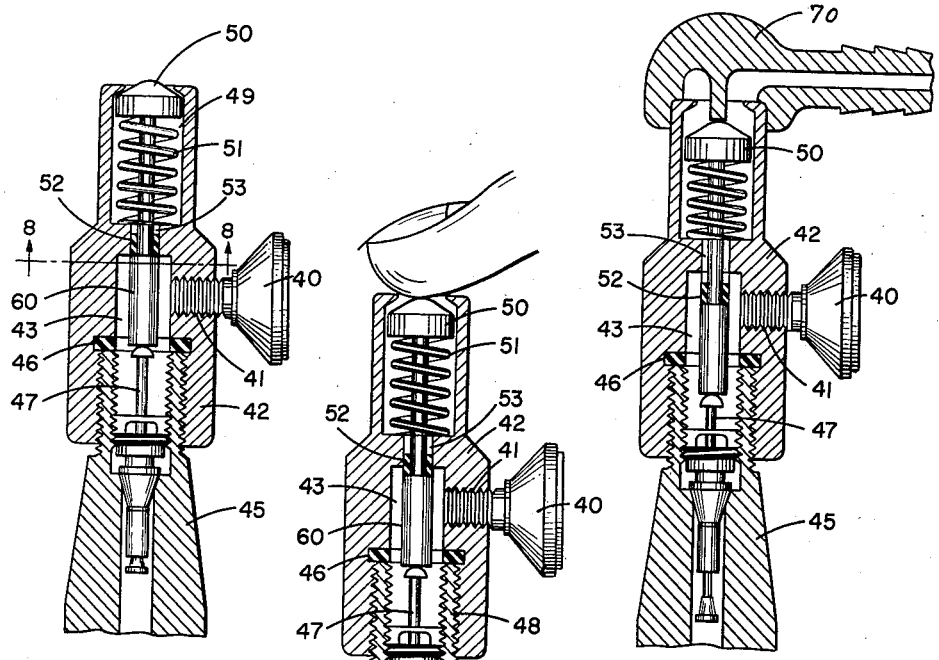
Fig. 5
Fig. 6
Fig. 7
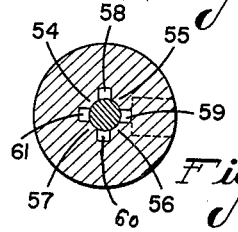
Fig. 8
INVENTOR.
GAVIN W. LAURIE JR.
BY Dos T. Hatfield
ATTORNEY United States Patent Office 2,866,432
Patented Dec. 30, 1958

2,866,432

TIRE PRESSURE INDICATING DEVICE

Gavin W. Laurie, Jr., Springfield, Pa.

Application September 7, 1956, Serial No. 608,563

6 Claims. (Cl. 116—34)

This inventon relates to a pressure indicating device, and more particularly to a pneumatic pressure responsive and indicating device adapted to indicate the pressure of pneumatic tires and the like. The present invention is an improvement of the pressure responsive and indicating device as shown in Patent No. 2,651,279 issued to Gavin W. Laurie on September 8, 1953.

As shown in the patent referred to above, a pressure indicating device is known that will readily indicate the condition when less than a minimum amount of pressure is present in a tire or other container of gas under pressure. In its essential form, the indicating device is formed of a conical or cylindrical body or chamber adapted to be threadably attached at its neck portion to a tire stem and having a spring diaphragm closing its base portion. The spring diaphragm is normally bowed outwardly but may be depressed to bow inwardly while at the same time actuating the tire valve to admit air from the tire into the conical chamber. If the pressure thus admitted to the chamber is equal to or greater than a predetermined minimum value, the diaphragm will again be forced outwardly to its normal position and due to the resilient nature of the diaphragm, an audible click will be emanated. To adjustably predetermine the minimum pressure response of the spring diaphragm in a manner to produce an audible click, an additional coil spring and threaded collar were provided as disclosed in the aforementioned patent.

It is a principal object of the present invention to provide an improved form of pressure responsive indicating device of the type generally shown in the above-mentioned patent and having a simplified and improved arrangement for adjustably predetermining the minimum air pressure to which the indicating device will respond with an audible click.

Another object of the invention is to provide an improved and simplified device which may be detachably secured to the valve stem of a pneumatic tire and which may be easily actuated manually to indicate, by sound, sight or touch, whether or not the pressure within the tire is equal to or above a predetermined amount, and which may also be manually adjusted to variably predetermine the minimum pressure response of the device.

Another object of the invention is to provide an improved pressure responsive indicating device adapted to be detachably secured to a tire valve stem or the like according to the invention in a modified form which will enable the pressure within the tire to be raised or lowered without detaching the device from the tire stem.

Yet another object of the invention is to provide an improved pressure responsive indicating device of the snap acting type which may be accurately calibrated and will give repeated uniform response for the calibrated pressure.

Further objects, features and advantages of the invention will be apparent with reference to the following specification and drawings in which:

Fig. 1 is a fragmentary detailed sectional view of the diaphragm end of the device as adjusted for one value of minimum pressure response;

Fig. 2 is a view similar to Fig. 1 but with the device shown as adjusted to respond to a lower minimum pressure than as shown by Fig. 1 of the drawing;

Fig. 3 is a vertical section of the pressure indicator of the invention as detachably secured to a tire valve stem, the latter being shown by dotted lines;

Fig. 4 is a view similar to Fig. 1 but showing a modified form of the invention;

Fig. 5 is a longitudinal section of a modified form of the invention as intended to permit the raising or lowering of the air pressure within the tire and with the parts in the normal position;

Fig. 6 is a view similar to Fig. 5 but with the parts in the position to measure the air pressure in the tire;

Fig. 7 is a view similar to Fig. 5 but with the parts in the position to admit or release air with relation to the tire;

Fig. 8 is a cross-sectional view on the line 8—8 of Fig. 5, and

Fig. 9 is a fragmentary axial section through the indicator body of Figs. 5-8.

Referring now to the drawings, and more particularly to Fig. 3, the combined dust cap and valve stem seal of the present invention is provded with a spring snap diaphragm 10 which is normally bowed outwardly and is designed to be movable between two different positions such as the normally bowed outward position shown by the solid lines and the bowed inward or depressed position shown at 10a by the dotted lines. The diaphragm 10, which may be formed of light gauge steel or the like is constructed so as to move between the two aforementioned positions with a snap action, such action emanating an audible sound or click upon each movement, whether inward or outward. The external circumference of the diaphragm 10 is sealed air tight to the conical body or chamber 11 by a gasket member 12 of any suitable material such as rubber or the like which will be later described in more detail. The gasket material is sufficiently resilient to allow a limited movement of the circumferential edges of the diaphragm 10 while still maintaining a pressure seal as will be required whenever the diaphragm is moved from an outwardly bowed to an inwardly bowed positon or vice versa. This may be of particular advantage when using a plain diaphragm with a simple arched or bowed configuration.

The central neck portion of the conical body member 11 is provided with an axially threaded bore 13 which may be threaded onto the threaded end of the tire valve stem as generally shown by the dotted lines 14. A gasket member 15 engages the end of the valve stem 14 and the inner end of the bore 13 of the conical body 11 in a manner to provide an air tight seal as should be readily understood. A central bore 16 provides pressure communication from the end of the valve stem 14 into the pressure chamber 17 as formed by the conical body 11 and sealed diaphragm 10.

A plunger stem 18 is journalled loosely in the central bore 16 so that when the diaphragm 10 is depressed to the dotted line position, the stem 18 will be moved to engage the free end 19 of the valve actuating stem to release the tire pressure into the pressure chamber 17. The stem 18 may as previously stated be journalled loosely within the central bore 16 so as to be slidable back and forth above the end 19 of the valve actuating stem and in effect be floating in such position with its lower end normally resting lightly on the valve stem end 19 before it is depressed. However, when the stem 18 is depressed and if the tire pressure thus released into the pressure chamber 17 is equal to or greater than a predetermined minimum amount, the diaphragm 10 will snap outwardly with an audible click and the stems 18 and 19 may be allowed to return to their normal positions. If the tire pressure is less than the predetermined minimum amount, the diaphragm 10 will remain in the depressed position thus indicating a need to add pressure to the tire under test.

The diaphragm 10 will reverse itself from the depressed position at a certain predetermined minimum pressure depending on the thickness of the diaphragm, the shape of the diaphragm, the temper of the metal forming the diaphragm, the method used to mount the diaphragm, and so forth. As shown by Fig. 1 of the drawing, the diaphragm 10 may be finished to normally have a slight outwardly bowed configuration. It should be understood that such diaphragm having the form as shown in Fig. 1 of the drawings and being held in position by means of a line or knife edge contact device will consistently respond to a predetermined minimum pressure when reversing itself from the inwardly bowed position. In order to reduce the minimum pressure to which the diaphragm 10 will respond, an adjusting ring 20 is provided in accordance with the present invention.

It will be noted that the mouth of the conical body 11 is provided with internal threads 21 adapted to engage external threads 22 of the adjusting ring 20. A suitable annular recess 23 is formed in the body 11 to receive the threaded adjusting ring 20 as it is threaded into the body 17. It will be seen that the gasket material 12 as previously described is actually seated between an annular ledge or shoulder 24 of the body 11 and the inner unthreaded wall of the adjusting ring 20. The conical body 11 has an upstanding annular knife edge 25 while the adjusting ring 20 has a depending annular knife edge 26 and it will be noted that the knife edge 26 of the adjusting ring 20 is of different or greater diameter than knife edge 26 of the conical body 11. Since the spring diaphragm 10 is sealed in the gasket material 12 and passes between the knife edges 25, 26, it should be apparent that when the adjusting ring 20 is threaded further into the conical body 11, the diaphragm 10 will be bowed outwardly to a greater extent due to the interaction of the knife edges 25 and 26 as shown in Fig. 2 of the drawings. It has been found that when the adjusting ring 20 is adjusted so that the diaphragm 10 is normally bowed outwardly to a greater extent as shown in Fig. 2 of the drawings, the diaphragm will respond to a lower minimum pressure when reversing itself from the inwardly bowed to the outwardly bowed position.

It should now be apparent that the minimum pressure response of the device may be easily adjusted by rotating the adjusting ring 20 to vary the arc of bowing of the diaphragm until the desired response is obtained. For example, assume that it is desired that the device respond to a minimum tire pressure of twenty-four pounds per square inch. The tire is first filled with air to such pressure from an accurately calibrated source of air pressure. Thereafter, the device of the invention is threaded onto the tire valve stem and the adjusting ring 20 is unthreaded until the diaphragm 10 assumes its minimum outwardly bowed and unstressed form similar to that shown in Fig. 1 of the drawings. The diaphragm is then depressed to the dotted line position shown by Fig. 2 of the drawings, and if the thickness, type and temper of metal for the diaphragm have been suitably chosen, the diaphragm will remain in the depressed position even though the air pressure in the chamber 17 is equal to the desired minimum air pressure of twenty-four pounds per square inch. Thereafter the adjusting ring 20 is turned to thread the ring inwardly causing the knife edges 25 and 26 to contact the diaphragm 10 in a manner to increase the arc of the bow of the diaphragm which is presently bowed inwardly. Upon bowing the diaphragm 10 to a sufficiently greater amount, the diaphragm will respond to the air pressure in the chamber 17 and reverse itself to snap outwardly with an audible click. The device is thus adjusted to respond to the predetermined minimum air pressure of twenty-four pounds per square inch such as present in the chamber 17.

Referring to Fig. 4 of the drawings, a simplified non-adjustable form of the invention is shown. With this arrangement both the knife edge supporting jaws 30 and 31 corresponding to the knife edges 25, 26 of Figs. 1 and 2 are of the same diameter so that the snap action calibration of the diaphragm 32 is determined solely by the temper of the diaphragm material, its thickness, etc., and not the relative positions of the knife edge jaws 30 and 31. It should be pointed out that the accuracy of calibration and the consistency of response to the calibrated pressure by applicant's invention is primarily due to the provision of the knife edge jaw supports such as the jaw surfaces 30 and 31 or 25 and 26. The provision of the knife edge or line support for the diaphragm according to the invention forms what is essentially a pivot point of contact with the diaphragm so as to relieve strains on the diaphragm at such point of contact when the diaphragm is flexed inwardly or outwardly and is, therefore, to be distinguished from the flat surface contact diaphragm support such as is known in the prior art.

Another modified form of the invention is shown in Figs. 5 through 9 of the drawings by which a valve arrangement is provided to allow pressure increases or reductions to be made through the indicating device while attached to the tire valve stem or the like. The snap acting pressure indicator is generally shown at 40 and it will be understood that it embodies an arrangement similar to that shown and previously described in connection with Figs. 1 through 3 or Fig. 4 of the drawings. The indicator 40 is secured by a threaded air tight connection 41 to a valve body 42 having an inner air chamber 43 in communication with the air space behind the diaphragm of the indicator 40. The valve body 42 is adapted to be detachably secured to the tire valve stem 45 in the obvious manner by a threaded bore 48 and is sealed by a suitable gasket 46.

As shown by Fig. 5, with the parts in the normal position, the tire valve stem 47 remains closed. The details of the indicator arrangement for the form of the invention shown and described above in connection with Figs. 5–9 of the drawings are most clearly shown by the sectional view of Fig. 9. While either the adjustable diaphragm arrangement of Figs. 1 and 2, or the non-adjustable arrangement of Fig. 4, may be used in this form of the invention, Fig. 9 shows a preferred form of the invention in which the adjustable diaphragm arrangement of Figs. 1 and 2 is used. Of course, in this form of the invention, the stem 18, as shown in Figs. 1 and 2 of the drawings, is not provided or used since the indicator valve stem 50 has been arranged to actuate the tire valve stem as previously described. When it is desired to measure the pressure of air within the tire, the indicator valve stem 50 which passes through an opening 49 of the body 42 is depressed against the force of the coil spring 51 to a first depressed position as shown in Fig. 6 of the drawings. In such first depressed position the lower end of the indicator valve stem 51 contacts and depresses the tire valve stem 47 to admit the air from the tire into the valve chamber 43 and the chamber of the indicator 40. However, a seal 52 on a shoulder of the indicator valve stem 50 remains in contact with the interior walls 53 of the bore extending into the chamber 43 through which the indicator valve stem 50 is loosely journalled and thus with the parts in the positions shown in either Fig. 5 or Fig. 6, the air pressure within the chamber 43 is not released to the atmosphere.

On the other hand, when the indicator valve stem is further depressed to a second depressed position as shown in Fig. 7 of the drawings, the sealing gasket 52 is disengaged from the opening wall 53 to release to the atmosphere the air or other pressure within the tire and chamber 43. It should be obvious that the pressure within the tire may be increased by applying the chuck 70 of a higher pressure source in the manner shown by Fig. 7 of the drawings.

Referring again in particular to Figs. 5 and 8 of the drawings, the valve chamber 43 may be formed with spline surfaces 54—57 for cooperation with similar spline surfaces 58—61 on the indicator valve stem 50 thus providing the required bearing support for the stem 50.

It should be understood that by a proper choice of materials for the indicator diaphragm 10 or 32 the range of response of the device may be selected for any suitable application or use. Obviously, the adjusting ring 20 may be provided with a knurled or otherwise specially formed exterior surface to facilitate its rotation for adjusting purposes. Various modifications may be made within the spirit of the invention and the scope of the appended claims.

I claim:

1. In combination with a valve stem having a tire valve therein, a tire pressure indicator, said indicator comprising a body having an open ended chamber adjacent one end thereof, a snap diaphragm normally bowed outward and extending across the open end of said chamber, indicator adjusting means to adjustably predetermine the normal arc of bowing of said diaphragm, sealing means to seal said diaphragm to said chamber in air-tight relation to thereby close the open end of said chamber to the atmosphere, said diaphragm being movable between an inward depressed position and the normally bowed outward position with an audible click action, the other end of said body having a threaded bore in communication with said chamber and adapted to be detachably secured to the threaded end of said tire valve stem, and a slidable plunger stem extending through said chamber and bore and having one end adapted to contact the inner surface of said diaphragm, the other end of said stem being positioned to contact the valve stem of the tire valve when said diaphragm is moved to the depressed position to thereby release the tire air pressure to within the bore and chamber behind said diaphragm.

2. In combination with a valve stem having a tire valve therein, a tire pressure indicator, said indicator comprising a body having an open ended chamber adjacent one end thereof, a circular snap diaphragm normally bowed outward and extending across the open end of said chamber, indicator adjusting means to adjustably predetermine the normal arc of bowing of said diaphragm, sealing means to seal said diaphragm to said chamber in air-tight relation to thereby close the open end of said chamber to the atmosphere, said diaphragm being movable between an inward depressed position and the normally bowed outward position with an audible click action, the other end of said body having a threaded bore in communication with said chamber and adapted to be detachably secured to the threaded end of said tire valve stem, and a slidable plunger stem extending through said chamber and bore and having one end adapted to contact the inner surface of said diaphragm, the other end of said stem being positioned to contact the valve stem of the tire valve when said diaphragm is moved to the depressed position to thereby release the tire air pressure to within the bore and chamber behind said diaphragm, said indicator adjusting means including a first annular ring having a diameter less than the diameter of said diaphragm secured to said chamber in a position to engage one side of said diaphragm and a second annular ring having a diameter greater than said first ring but less than the diameter of said diaphragm threaded on said chamber and engaging said diaphragm on the other side thereof near its periphery in a manner to bow said diaphragm outwardly as said second ring is rotated in one direction.

3. The invention of claim 1 in which said body is circular and said indicator adjusting means is comprised of, a threaded ring, said body having a threaded annular recess adjacent said sealing means and adapted to receive said ring in threaded relation, an annular knife edge on said body adapted to engage the underside of said diaphragm near its periphery, and an annular knife edge on said threaded ring adapted to engage the upper side of said diaphragm near its periphery, the knife edge of said rings being of different diameter than the knife edge of said body whereby the normal arc of outward bowing of said diaphragm is changed as said annular ring is rotated in one direction.

4. In combination with a valve stem having a tire valve therein, a tire pressure indicator, said indicator comprising a body having an open ended chamber adjacent one end thereof, a snap diaphragm normally bowed outward and extending across the open end of said chamber, sealing means to seal said diaphragm to said chamber in air-tight relation to thereby close the open end of said chamber to the atmosphere, said diaphragm being movable between an inward depressed position and the normally bowed outward position with an audible click action, said body having a threaded bore in communication with said chamber and adapted to be detachably secured to the threaded end of said tire valve stem, an opening in said body extending into said chamber, an indicator valve stem extending through the opening of said body in a normal position and through said chamber and threaded bore to be movable to a first depressed position to contact and depress the tire valve stem when said body is secured to the tire valve stem, and sealing means associated with said indicator valve stem to seal the opening of said body and indicator valve stem in the normal and first depressed positions, said sealing means being ineffective to seal said indicator valve stem to the opening of said body when said indicator stem is further depressed to a second depressed position.

5. In combination with a valve stem having a tire valve therein, a tire pressure indicator, said indicator comprising a body having an open ended chamber adjacent one end thereof, a snap diaphragm normally bowed outward and extending across the open end of said chamber, indicator adjusting means to adjustably predetermine the normal arc of bowing of said diaphragm, sealing means to seal said diaphragm to said chamber in air-tight relation to thereby close the open end of said chamber to the atmosphere, said diaphragm being movable between an inward depressed position and the normally bowed outward position with an audible click action, said body having a threaded bore in communication with said chamber and adapted to be detachably secured to the threaded end of said tire valve stem, an opening in said body extending into said chamber, an indicator valve stem extending through the opening of said body in a normal position and through said chamber and threaded bore to be movable to a first depressed position to contact and depress the tire valve stem when said body is secured to the tire valve stem, and sealing means associated with said indicator valve stem to seal the opening of said body and indicator valve stem in the normal and first depressed positions, said sealing means being ineffective to seal said indicator valve stem to the opening of said body when said indicator stem is further depressed to a second depressed position.

6. The invention of claim 5 in which said body is circular and said indicator adjusting means is comprised of, a threaded ring, said body having a threaded annular recess adjacent said sealing means and adapted to receive said ring in threaded relation, an annular knife edge on said body adapted to engage the underside of said diaphragm near its periphery, and an annular knife edge on said threaded ring adapted to engage the upper side of said diaphragm near its periphery, the knife edge of said ring being of different diameter than the knife edge of said body whereby the normal arc of outward-bowing of said diaphragm is changed as said annular ring is rotated in one direction.

References Cited in the file of this patent

UNITED STATES PATENTS

| | | |
|---|---|---|
| 1,335,921 | Rydberg | Apr. 6, 1920 |
| 2,273,968 | Lewis | Feb. 24, 1942 |
| 2,651,279 | Laurie | Sept. 8, 1953 |
| 2,761,411 | Pross | Sept. 4, 1956 |